United States Patent [19]
Shepherd et al.

[11] Patent Number: 5,024,288
[45] Date of Patent: Jun. 18, 1991

[54] SOUND ATTENUATION APPARATUS

[75] Inventors: Kevin P. Shepherd, Yorktown; Ferdinand M. W. A. Grosveld, Hampton, both of Va.

[73] Assignee: The United States of America as represented by the Administrator of the National Aeronautics and Space Administration, Washington, D.C.

[21] Appl. No.: 392,165

[22] Filed: Aug. 10, 1989

[51] Int. Cl.$^5$ .............................. E04B 1/82; F01N 1/06
[52] U.S. Cl. ...................................... 181/206; 181/286; 181/290; 181/295; 381/71; 381/94; 52/144
[58] Field of Search ............... 181/206, 286, 295, 296, 181/30, 290; 381/71, 94; 52/144, 145

[56] References Cited

U.S. PATENT DOCUMENTS

| 3,229,429 | 1/1966 | Conrad | 52/144 X |
| 3,879,578 | 4/1975 | Wildi | 381/71 X |
| 4,177,874 | 12/1979 | Angelini et al. | 181/206 |
| 4,589,137 | 5/1986 | Miller | 381/71 X |
| 4,600,078 | 7/1986 | Wirt | 181/286 |
| 4,665,549 | 5/1987 | Eriksson et al. | 381/71 |
| 4,715,559 | 12/1987 | Fuller | 381/71 X |
| 4,783,817 | 11/1988 | Hamada | 381/71 |

FOREIGN PATENT DOCUMENTS 2550903  2/1985  France ................... 381/71

Primary Examiner—Benjamin R. Fuller
Attorney, Agent, or Firm—George F. Helfrich; Harold W. Adams; John R. Manning

[57] ABSTRACT

Apparatus for reducing acoustic transmission from mechanical or acoustic sources by means of a double wall partition, within which an acoustic pressure field is generated by at least one secondary acoustic source. The secondary acoustic source is advantageously placed within the partition, around its edges, or it may be an integral part of a wall of the partition.

8 Claims, 2 Drawing Sheets

SOUND ATTENUATION APPARATUS

ORIGIN OF THE INVENTION

The invention described herein was made in the performance of work under a NASA contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

The invention relates to the field of sound barriers and in particular to a sound barrier capable of attenuating sound over a range of frequencies.

2. Description of Related Art

It is well known in the field of sound barriers that a single wall will reduce the sound transmitted by a source. In order to achieve the desired degree of sound attenuation, it may be necessary to use a wall so heavy or stiff as to be impractical, as for example, a wall onboard or as part of an aircraft or space vehicle, where it is desired to minimize weight. Further, the wall thickness required increases as the sound frequency decreases. Thus, especially at low frequencies, particularly thick and heavy walls are required.

One improvement to the use of a single wall is a double wall or other compound wall structure, which may have the capability of equivalent sound attenuation at lower total weight. The double or compound wall may also be stiffened, or filled with a material which absorbs or damps sound, such as a fiberglass mat or blanket; also, visco-elastic damping materials may be applied to the walls.

However, even compound walls with acoustic treatment may not be suitable. U.S. Pat. No. 4,600,078 teaches the use of acoustical resonators with a double wall partition as a means of attenuating sound. Each resonator may be designed for a specific frequency.

The use of resonators inherently imposes limitations which it is an object of the present invention to overcome.

Accordingly, it is a primary object of the present invention to provide an improved sound barrier.

It is another object of the present invention to provide a sound barrier with increased sound attenuation effectiveness without increasing the total weight thereof. It is a further object of the present invention to provide a sound barrier which conveniently attenuates sound of varying frequency, or sound of simultaneous multiple frequencies.

It is still another object of the present invention to provide a sound barrier which incorporates acoustical elements.

It is a further object of the present invention to provide a sound barrier suitable for the construction of fuselage walls for surface vehicles, marine/submarine craft, aircraft, and space vehicles.

SUMMARY OF INVENTION

According to the present invention, a double wall partition is placed between a primary acoustic source which it is desired to attenuate and a receiver zone. Within the partition is a sound-transmitting medium such as air. At least one secondary acoustic source, which may be a loudspeaker, is used to generate an acoustic pressure field within the partition, which has the effect of reducing sound in the receiver zone.

It is not an essential element of this invention that the secondary acoustic source(s) be within the double wall partition. Indeed, the secondary acoustic source(s) may be external to the double wall partition. However, the secondary acoustic source(s) or its (their) mountings may be an integral part of at least one wall of the partition. Where the secondary acoustic source is a loudspeaker, it must be enclosed, and the enclosure may be an integral part of a wall or of the partition perimeter.

The frequency of the primary and secondary acoustic source(s) must be substantially identical. It may be necessary, depending on the characteristics of the primary source, to adjust the amplitude and phase of the sound generated by the secondary source(s). Thus, the invention has its broadest application where the frequency, amplitude and phase of the secondary source(s) are adjustable.

Depending on the characteristics of the primary source, a greater degree of sound attenuation may be achieved for a given secondary acoustic source depending on its location with respect to, or within, the partition. It is especially advantageous if the secondary source is readily movable, especially by a means external to the partition.

It is especially beneficial to have one or more sensing devices in the receiver zone or within the partition to measure sound level and to communicate with an automatic control device to vary the characteristics of the sound generated by the secondary acoustic source(s), viz., the frequency, amplitude and phase thereof, or to change the location of the secondary acoustic source(s), so as to readily and continuously minimize the sound perceived in the receiver zone.

Especially good results are obtained when the spacing between the walls of the partition is less than the wavelength of the sound to be attenuated.

BRIEF DESCRIPTION OF THE DRAWINGS

For a more complete understanding of the present invention, including its objects and benefits, reference should be made to the Description of the Preferred Embodiments, which is set forth below. This description should be read together with the accompanying drawings, wherein.

DESCRIPTION OF THE PREFERRED EMBODIMENTS

The invention may be understood by reference to the following examples and their reference figures.

EXAMPLE 1

Figure 1B:
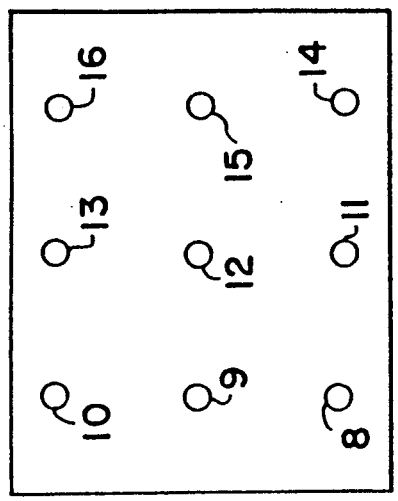
FIG. 1B is a schematic showing nine measurement positions in a vertical plane parallel to the sound barrier of FIG. 1A and spaced 24 inches therefrom.
Figure 1A:
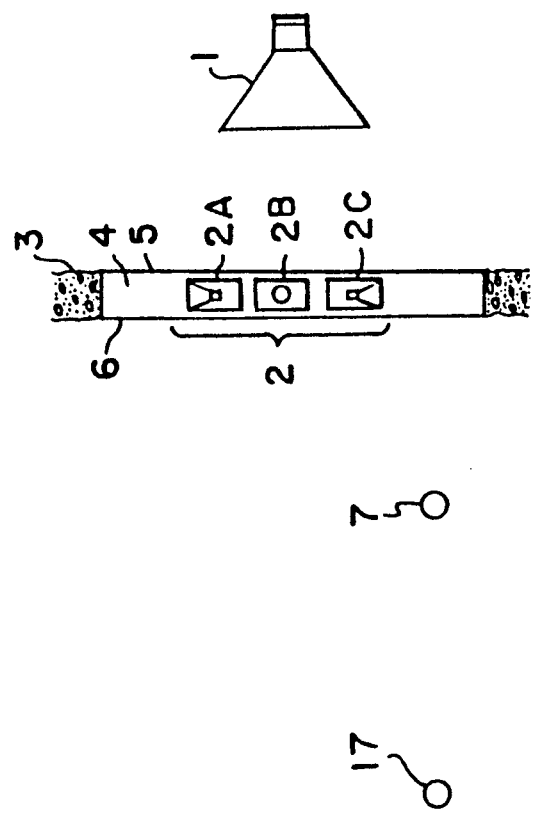
FIG. 1A is a schematic showing a side view of one embodiment of a sound barrier according to the present invention.

Referring now to FIG. 1A, two rooms, a source room and a receiving room, were separated by a common concrete wall 3 which had a 48"×60" opening therein. A double wall partition 4 was installed in the opening, made of the following materials: wall 5 was 0.063 inches thick aluminum and wall 6 was 0.25 inches thick plexiglass.

A loudspeaker was placed in the source room, to serve as primary source 1, located 18-inches from partition 4. Source 1 generated a pure tone signal at a frequency of 125 Hz. In the receiving room, a microphone 7 was placed 24-inches from wall 6 and 18-inches below the horizontal centerline of partition 4.

The signal generated by source 1 was measured at 84 dB by microphone 7.

A closepacked cluster of four juxtaposed loudspeakers 2A, 2B, 2C, and 2D was located at the center of the double wall partition to comprise secondary source 2. A 125 Hz signal was fed to the cluster, and the amplitude and phase were adjusted until the sound detected by microphone 7 was at a minimum. The minimum sound level measured by microphone 7 was 47 dB when the phase difference between sources 1 and 2 was 164°.

EXAMPLE 2

Using the same room and conditions as in Example 1, noise reduction was measured at nine different locations (8, 9, 10, 11, 12, 13, 14, 15, and 16) in a vertical plane containing microphone 7 as shown in FIG. 1B. With source 1 and source 2 at the identical frequencies, amplitudes and respective phases as in Example 1, an average sound pressure level for the nine locations was measured first when source 1 alone was operating, and then when sources 1 and 2 were operating together at the identical frequency, amplitudes and phases as in Example 1. When sources 1 and 2 were operated, the average sound pressure level was decreased by 8.2 dB, compared to only source 1 operating.

EXAMPLE 3

Example 1 was repeated, but with microphone 7 moved to a location 17, which is 60-inches from the partition rather than 24-inches. At location 17, the measured sound pressure level went from 88 dB without source 2 to 49 dB with source 2 operating; the phase difference between signals to source 1 and 2 was 161°. This demonstrates that a noise reduction is obtained at varying distances from the partition.

EXAMPLE 4

Example 3 was repeated, using the same location 17 for the microphone, but at different frequencies. Results follow:

| Frequency | 200 Hz | 400 Hz |
|---|---|---|
| Source 1 only, measured dB | 86 | 77 |
| Source 1 and source 2 operating, dB | 49 | 42 |
| Phase difference, degrees | 220° | 344° |

This Example shows that noise is reduced at different frequencies.

EXAMPLE 5

Figure 2B:
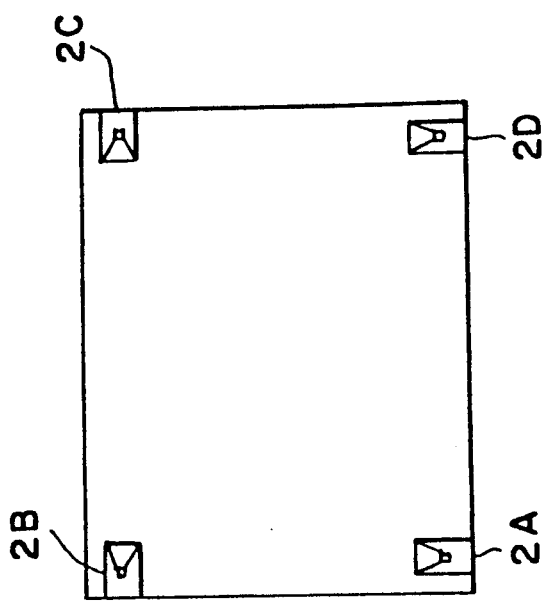
FIG. 2B is a schematic showing the positions of four loudspeakers within the sound barrier of FIG. 2A.
Figure 2A:
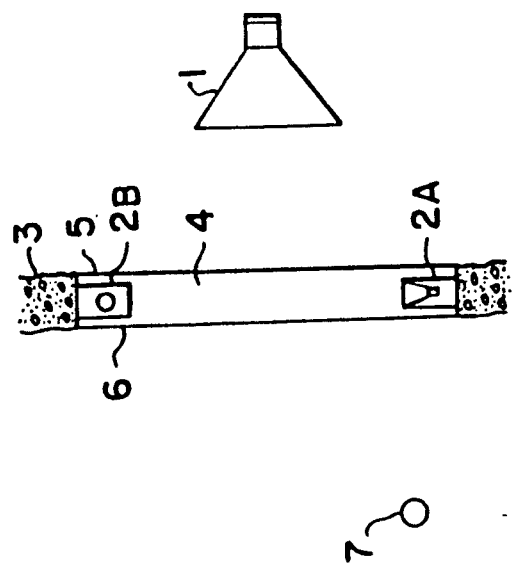
FIG. 2A is a schematic showing a side view of another embodiment of a second barrier according to the present invention.

Example 1 was repeated, but the four loudspeakers of source 2 were placed in the four corners within the double wall partition 4. See FIGS. 2A and 2B.
Results follow:

| Frequency | 125 Hz |
|---|---|
| Source 1 | 84 dB |
| Source 1 + Source 2 | 58 dB |
| Phase Difference, degrees | 291° |

This Example shows that the source 2 location affects results quantitatively, but in all cases studied, there is some noise reduction.

What is new and desired to be secured by Letters Patent of the United States is:

1. A sound barrier comprising:
   a multiple wall partition positioned between a primary acoustic source producing a first sound of a frequency and a zone wherein the sound of said primary acoustic source is to be attenuated;
   a sound-transmitting medium within said partition; and
   at least one secondary acoustic source positioned to generate a second sound within the partition, the second sound having a frequency, magnitude, and phase selected so as to achieve attenuation in said zone.

2. The sound barrier of claim 1, wherein the multiple wall partition is a double wall partition.

3. The sound barrier of claim 2 wherein the at least one secondary acoustic source is placed within the double wall partition.

4. The sound barrier of claim 2 wherein the at least one secondary acoustic source is external to the double wall partition.

5. The sound barrier of claim 2 wherein the at least one secondary acoustic source is an integral part of at least one of the walls of the partition.

6. The second sound barrier of claim 2 wherein the second sound generated by the at least one secondary acoustic source may be adjusted with respect to a member of the group consisting of: frequency, amplitude, and phase.

7. The sound barrier of claim 6 wherein at least one sound-sensing device is placed in the receiver zone or within the partition and said at least one sound-sensing device is used to automatically vary a member of the group consisting of frequency, amplitude, and phase of the second sound generated by the at least one secondary acoustic source so as to maximize the desired sound attenuation.

8. The sound barrier of claim 3 wherein said at least one secondary acoustic source is readily movable by a means external to the partition.

* * * * *